United States Patent [19]

Babitzka et al.

[11] Patent Number: 4,494,727
[45] Date of Patent: Jan. 22, 1985

[54] ELECTRICALLY CONTROLLABLE VALVE

[75] Inventors: Rudolf Babitzka, Kirchberg; Walter Beck, Schwieberdingen; Ernst Linder, Mühlacker, all of Fed. Rep. of Germany

[73] Assignee: Robert Bosch GmbH, Stuttgart, Fed. Rep. of Germany

[21] Appl. No.: 311,678

[22] Filed: Oct. 15, 1981

[30] Foreign Application Priority Data

Oct. 23, 1980 [DE] Fed. Rep. of Germany ....... 3039915

[51] Int. Cl.$^3$ .............................................. F16K 31/02
[52] U.S. Cl. ........................................ 251/64; 251/70; 251/129; 251/172
[58] Field of Search ............... 251/68, 70, 172, 129, 251/64; 137/543

[56] References Cited

U.S. PATENT DOCUMENTS

| 775,054 | 11/1904 | Waterman | 251/70 |
| 959,609 | 5/1910 | Roehrich | 251/70 |
| 3,056,575 | 10/1962 | Mooney | 251/172 |
| 4,284,263 | 8/1981 | Newcomb | 251/129 |
| 4,383,641 | 5/1983 | Shreve | 251/68 |

Primary Examiner—Martin P. Schwadron
Assistant Examiner—John A. Rivell
Attorney, Agent, or Firm—Frishauf, Holtz, Goodman & Woodward

[57] ABSTRACT

To provide for extremely short valve operating time periods, in the order of up to $10^{-5}$ seconds, for example, a valve element (3, 33, 53, 63, 73, 93) is slidable within a bore (2, 52), movable by a spring (10, 60) or by applied hydraulic pressure (P), and restrained from movement by an electrical positioning element (14, 44, 45, 94) which has a positioning movement transverse to the movement of the valve element, and which clamps the valve element in the bore, or an extending flap or strip (34) against a counter element, which may be another positioning element (45). Preferably, and for fast operation, the positioning element (14) is a stack or column (15) of piezoelectric disks (16) which, when energized, push a stem or bolt element (13) in clamping direction towards the valve stem; alternatively, (FIG. 6), the positioning element (94) can be a solenoid coil pushing the armature (93) thereof into clamping direction towards the valve stem.

9 Claims, 6 Drawing Figures

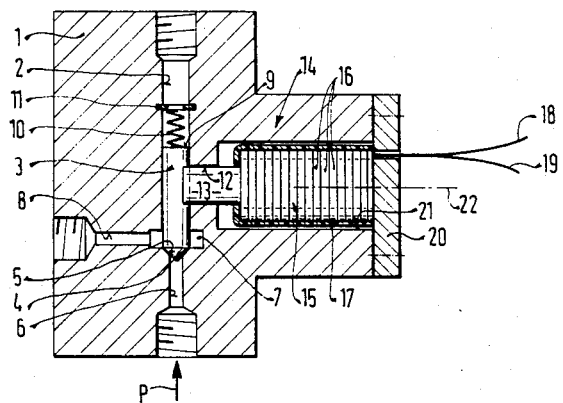
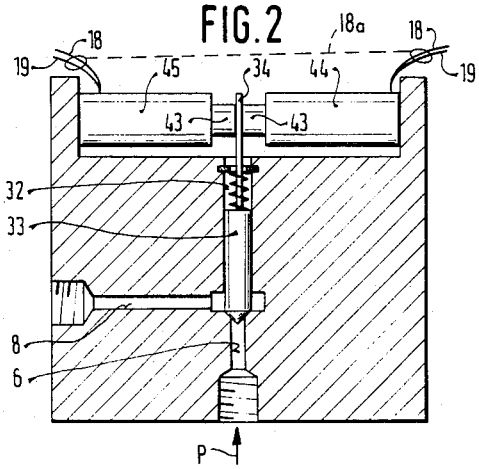
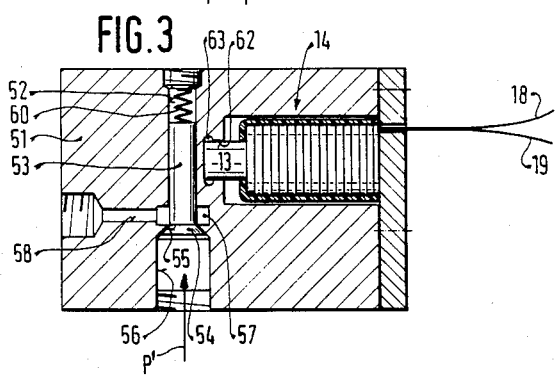

ELECTRICALLY CONTROLLABLE VALVE

Cross reference to related applications, assigned to the assignee of the present application:

U.S. Ser. No. 274,526, filed June 17, 1981, Babitzka et al., now U.S. Pat. No. 4,382,243;

U.S. Ser. No. 311,676, filed Oct. 15, 1981, Babitzka et al. now U.S. Pat. No. 4,388,908;

U.S. Ser. No. 311,677, filed Oct. 15, 1981, Babitzka et al., now U.S. Pat. No. 4,438,363. (claiming priority No. P 30 39 973. 6).

The present invention relates to an electrically controllable valve, and more particularly to a valve which has extremely short operating time, and shorter than, for example, $10^{-3}$ seconds.

BACKGROUND

It is possible to construct valves with operating times in the order of $10^{-3}$ seconds. Such valves are used, for example, as fuel injection valves for internal combustion engines, for example Diesel engines, in which the initiation and termination of fuel injection has to be accurately controlled with respect to the reciprocating movement of the piston of the engine. It has been found that the response times of fuel injection systems for internal combustion (IC) engines still are too long; also, the fuel quantity vs. time characteristics of the operation of the valve is not steep enough for optimum operation of the engine.

THE INVENTION

It is an object to provide a valve which has a characteristic of injected fuel vs. time in which the opening of the valve is extremely short and, for example, in the order of $10^{-4}$ and even to, and below $10^{-5}$ seconds; a graph of injected fuel vs. time then, essentially, would be a square wave.

Briefly, the valve includes a valve element which can be prestressed by having a force applied thereto, for example hydraulic pressure, spring pressure or the like; when used for a fuel injection valve, the force is typically hydraulic pressure applied to the valve element. In order to obtain rapid operating time, the force is permitted to build up and the valve element is held in clamped, unmovable position, and released from clamped position, free to move, at a time instant which is determined by an electrical control signal. The release from clamped position is effected by an electrical positioning element which has a positioning movement including at least one component which is transverse or perpendicular to the moving direction of the valve element.

In accordance with a feature of the invention, the electrical positioning element is a stack of piezoelectric disks arranged, for example, in a column. The expansion force obtainable from piezoelectric elements is extremely high, although the expansion distance, itself, is low. Stacking a number of such elements together, longitudinally, increases the movement distance while still maintaining the clamping pressure which can be exerted on the valve element. The stack or column of piezoelectric disks can be arranged, for example, transverse to the moving direction of the valve element to effect clamping pressure thereon by a plug, bolt-like element, stem, or the like.

The valve, in accordance with the invention, has the advantage that response times in the microsecond range can be obtained. When using a piezoelectric column or stack, the response times are particularly short, and valve response times in the order of from 40 to $50 \times 10^{-6}$ seconds have been obtained. The piezoelectric stack includes at least two piezoelectric disks, and preferably more.

DRAWINGS

FIG. 1 is a longitudinal section view, in highly schematic form, of a first embodiment of an electrically controllable valve;

FIG. 2 is a similar view illustrating another embodiment;

FIG. 3 is a third embodiment of an electrically controllable valve which is normally open, and closeable under hydraulic pressure;

Figure 4:
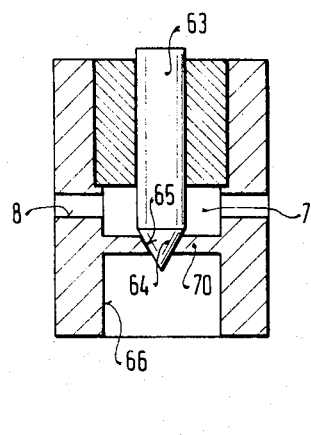
FIGS. 4 and 5 are enlarged schematic views illustrating the seating arrangement for valves.

Embodiment of FIG. 1: The valve has a housing 1 with an opening therein in form of a bore 2, forming a valve bore. The valve bore 2 retains, sealingly and slidingly, a piston-like movable valve element 3. The valve element 3, guided in bore 2, has a conical end valve surface 4 which cooperates with a corresponding hollow conical seating surface 5. The seating surface 5 is located immediately adjacent the transition from an inlet bore 6, coaxial with the valve bore 2, and leading to an enlarged inlet coupling. The valve bore 2 has a larger diameter than the inlet bore 6. A ring-shaped chamber 7 is located immediately adjacent the conical seating surface 5 at the interior of the valve, coaxial to the bore 2. An outlet bore 8 communicates with the ring chamber 7. The inlet bore 6 and the outlet bore 8 have the same diameter. Suitable connecting threads are located at the ends of the bores 6, 8.

The valve element 3 is elongated, and a pressure spring 10 engages the end of the valve element 3 remote from the valve cone 5. The other end of spring 10 is suitably supported within the valve bore 2, for example by fitting against a spring ring 11. Any other suitable counter elememt may be used, for example a threaded plug fitted into the bore 2.

A guide bore 12 terminates in the bore 2, approximately midway of the axial extent of the valve element 3, when the valve element 3 is seated with its valve cone 4 on the seating surface 5. The guide bore 12 slidably retains a clamping stem 13. The clamping stem 13 is part of an electrically controlled positioning element 14. The preferred direction of the bore 12 is at right angles to the bore 2.

The positioning element 14 is electrically controlled. As shown in FIG. 1, it includes a column 15 of stacked piezoelectric disks 16, located within an insulating housing 17. The piezoelectric disks 16 are electrically parallel connected and can be energized by a direct current supply over supply lines 18, 19. A cover 20 is located at the back side of the piezoelectric stack 15, closing off a blind bore 21 in the housing 1, within which the piezoelectric stack is located. The guide bore 12 within which the stem 13 is located ends in the bore 2.

FIG. 1 illustrates the condition of the positioning element 14 when the element 14 is deenergized. The distance between the outer surface of the valve element 3 and the end surface of the stem 13 is a few micrometers. Preferably, the end surface of the stem 13 is made slightly concave.

3

Operation: Upon energization of the electrical connecting lines 18, 19 by applying a direct current, the piezoelectric disks 16 will expand axially under the influence of the applied electrical field, upon simultaneous contraction of their diameter. Expansion will be in the direction of the longitudinal axis 22 of the stack of piezoelectric disks, causing the stem 13 to be shifted in the direction of the valve element 3. This engages the stem 13 with the outer surface of the valve element 3, and presses the valve element 3 against the opposite wall of the bore 2. The piezoelectric force is very high, although the distance of excursion of the disks is small. The high clamping force will securely press the valve element 3 against the opposite wall of the valve bore 2 and the retain the valve element 3 in tight engagement with the valve bore 2. Movement of the valve element 3 in the bore 2 is thus reliably inhibited.

In initial use, no fluid pressure is applied to the inlet 6. Spring 10 thus will press the valve element 3 downwardly so that its valve cone 4 will seat on the conical seating surface 5. The lines 18, 19 are then energized to clamp the valve element 3 in closed position. High fluid pressure P can then be applied to the inlet 6 without causing lifting of the valve element 3 off its seat, since it is clamped in position by the positioning element 14. Upon deenergization of the piezoelectric column or stack 15, the clamping force applied by stem 13 is released and the maximum pressure within the inlet duct 6 can lift the valve element 3 counter the force of spring 10 off its seat 5. The speed of movement of the stem 3 which can be obtained, that is, in other words, the positioning time, will then depend only on the mass of the valve element 3. This can be a very small pin-like element. If the valve element 3 is so constructed that its mass is small, extremely short positioning times can be obtained, which are shorter by several orders of magnitude than conventional electromagnetically operated valves. Response times of from between 40 to 50 microseconds can readily be obtained.

Embodiment of FIG. 2: The valve element 33 has a positioning extension 34 in the form of a spring element attached thereto. The spring element 34 extends in the direction of movement of the valve out of the bore 32. Two positioning elements 44, 45 are provided, each with stems 43. The positioning elements 44, 45 can be exactly identical to the element 14, FIG. 1.

Upon energization of supply lines 18, 19, the clamping stems 43 of the positioning elements 44, 45 clamp the spring tongue 34 between their end faces. Broken line 18a symbolizes synchronous energization.

This arrangement permits easy centering of the valve stem 33 and, hence, for long operating paths of the valve stem, has the advantage of lower friction between the relEsurfaces on the valve stem. The lower friction between the two clamping stems 43 insures rapid operation, even upon long valve opening movement distance.

Embodiment of FIG. 3: The valve is so arranged that, normally, and when in clamped position, it is held to be open, rather than closed (as in FIG. 1). The valve has a housing 51 with an inlet bore 56 and an outlet bore 58. In this embodiment, the inlet bore 56 has a greater diameter than the valve bore 52, in which the valve element 53 is guided. A hollow conical seating surface 55 is formed at the transition between the inlet bore 56 and the valve bore 52. A conical sealing surface 54 formed on an expanded mushroom-like extension of the valve element cooperates with the seating surface 55. A compression spring 60 holds the valve in the open position, as shown in FIG. 3.

The clamping stem 13, secured to the piezoelectric positioning element 14, is exactly similar to that described in connection with FIG. 1. Different from FIG. 1, the guide bore 62 is a blind bore which does not extend through and into the valve bore 53. Rather, the bottom of the blind bore 62 is formed with an enlargement 63, which for example may surround the entire bore 62, so that the portion of the housing 51 which remains between the bottom of the bore 62 and the valve bore 52 can yield resiliently upon force being applied by the stem 13.

Operation, with reference to the valve of FIG. 3: Initially, the spring 60 presses the valve downwardly into the open position, as shown in FIG. 3. The downward movement of the valve stem 53 may be limited by any suitable means, for example by a pin coaxial with spring 60 secured to a closing plug, and having a lost motion by a stop element or the like. Thus, a certain gap will exist between the seating surface 55 in the valve body and the sealing surface 54 on the projecting portion of the valve stem 53. The electrical connecting lines 18, 19 are energized, thus pressing the stem 13 towards the valve bore 52, elastically deforming the portion of the valve housing 51 which is left between the end wall of the blind bore 62 and the bore 52, and clamping the valve stem 53 in the open position. Hydraulic fluid flowing from the inlet 56 through the gap between the enlargement having the sealing surface 54 and the conical surface 55 and into the ring chamber 57 and to the outlet bore 58 is throttled at the flow constriction formed by the gap. Back-pressure P' will thus occur at the throttle formed by the projection carrying the sealing surface 54 which tends to close the valve. The valve cannot close, however, since, as has been assumed, the electrical lines 18, 19 are energized and the stem 53 is held in unmovable, clamped position. Upon deenergization of the positioning element 14, the full throttle pressure will be applied against the enlarged outer surface of the projection formed on the stem 53 and rapidly push the stem 53 upwardly, and hence the sealing surface 54 against the conical seating surface 55. The movement will be extremely rapid. To obtain particularly short response time periods, the valve element 53 should be made with as small a mass as possible.

Figure 5:
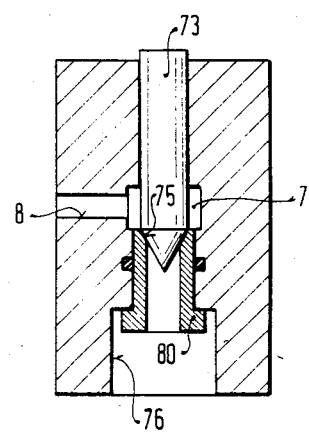

FIGS. 4 and 5 illustrate two embodiments which form the sealing surface for the valve illustrated in FIG. 1. These embodiments are particularly suitable for use with high pressures which, for example, occur in Diesel engine fuel injection systems, and provide for secure sealing of the valves.

Embodiment of FIG. 4: The valve stem 63 has a conical surface 64 formed thereon which cooperates with a conical seating surface 65. The inlet bore 66 tends to lift off the valve stem 63 from the seating surface 65. The seating surface 65 is formed in a resilient transverse wall 70, similarly to a membrane, which is elastically yieldable. This membrane-like housing wall 70, when the valve is closed, is pressed by the pressure within the inlet bore 66 against the conical surface 64 of the valve element 63. Thus, the seating surface 65 and the valve cone 64 are securely pressed against each other, resulting in particularly good sealing.

Embodiment of FIG. 5: Basically, the operating concept is the same as that illustrated in FIG. 4. The seating surface 75 is pressurized by the pressure of the fluid medium applied through the inlet bore 76. This pressure is applied at the side remote from the valve stem 73. To apply this additional sealing pressure, derived from the pressurized fluid in the inlet 76, an axially movable sleeve-like valve seat element 80 is provided. The pressure of the fluid medium, applied to the body 80 at its surface remote from the engagement with the valve element 73, presses the seating surface 75 thereof against the conical surface 74 of the valve stem 73.

Figure 6:
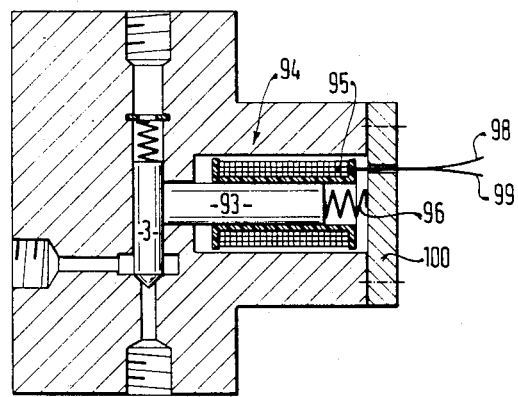
FIG. 6 is a schematic view of another electrically operated valve, using a coil for control of the positioning element.

Embodiment of FIG. 6: The basic principle of operation is similar to that shown in FIG. 1; the difference is the positioning element. Rather than using a stack of piezoelectric disks, a solenoid electromagnet is used. The force transfer is effected by a stem 93, formed as the armature of a solenoid magnet forming the electrical positioning element 94. The clamping force itself is applied by a strong compression spring 96, which is supported from a cover 100, suitably secured to the valve housing, for example by screws. This embodiment requires energization of the solenoid coil 95 to retract the stem armature 93 against the force of the spring 96 in order to permit the valve stem 3 to move. Upon energization, the stem 93 is retracted within the interior of the coil 95, compressing spring 96.

The extremely short positioning time periods available with piezoelectric elements cannot be obtained with a solenoid operating element 94. Yet, the positioning time periods can be much shorter than those of prior art electromagnetic valves which can have positioning time periods in the order of a millisecond. Thus, the operating time with respect to prior art valves can be substantially reduced.

The operating time periods of the valve of FIG. 6 can be reduced if the armature for the electromagnet is formed with threadlike projections which fit into associated, slightly larger recesses of the magnetic core of the solenoid. Such electromagnetic structures, by themselves, do not form the subject matter of this application, and are known; they are, however, particularly suitable in the valve of the embodiment of FIG. 6. (see "Automotive Engineering," July 1976, p. 77).

Various changes and modifications may be made, and features described in connection with any one of the embodiments may be used with any of the others, within the scope of the inventive concept.

In an example of a control valve for use in a Diesel engine injection system, a bore 2, 32, 52 of a diameter of 3.5 mm is suitable; the length of pin 3, 33, 53 suitably is: 5 mm.

The stack of piezoelectric disks 15 contains, for example, 50 disks of 10 mm diameter, which will provide for an overall stem travel of stem 13 of 0.015 mm, upon application of an energizing voltage of 700 VOC between lines 18, 19. In the valve of FIG. 3, the inside diameter of the inlet connection 56 is 7 mm, the enlarged portion formed at the end of the valve stem 53 fitting therein with a clearance of 0.4 mm. A suitable travel of the valve stem 3, 33, 53 is 0.8 mm. Suitable materials for the valve stem 3, 33, 53 providing low-mass elements with rapid response times are: Steel, Titanium.

The interengaging ridges and grooves between the armature and the core element of coil 95 cannot be shown in the drawings since they are too small, and reference is made to the cited literature.

We claim:
1. Electrically controllable valve having
   a housing (1);
   a bore (32) formed in the housing and having a bore axis;
   a movable valve element (33) slidably retained in the housing for movement in the direction along said axis;
   force generating means acting on the valve element; and comprising
   a first column or stack of first piezoelectric elements (16, 44) movable in a direction which is at least approximately perpendicular to the axis of the bore within which the movable valve element is slidable, secured to said housing;
   and a first clamping stem (43) operated by said first piezoelectric elements (16, 44);
   a counter element (45) positioned at least approximately coaxially with respect to the clamping stem and forming a counter pressure or anvil for the clamping stem comprising a second column or stack of second piezoelectric elements (45);
   a second clamping stem operated by said second piezoelectric elements projecting towards the first clamping stem; and
   an extension element (34) secured to said movable valve element (33) extending outside of said bore and positioned for engagement between said stem and said counter element,
   said stem being, selectively, engageable with the extension element (34) from the movable valve element to clamp the valve element in position within the bore, or permit movement of the valve element, respectively, under influence of the force generating means in accordance with the electrical condition of energization of said column or stack of piezoelectric elements.
2. Valve according to claim 1, wherein
   said first column or stack of piezoelectric elements (44) and said second column or stack of piezoelectric elements (45) are conjointly energizable for simultaneous opposite clamping and releasing movement of the extension element (35) from the movable valve element (33) by the respective stems.
3. Valve according to claim 1, wherein the force generating means comprises a spring (10, 60).
4. Valve according to claim 1, wherein said force generating means comprises hydraulic pressure (P).
5. Valve according to claim 1, wherein the force generating means comprises hydraulic pressure lifting the valve element (3, 33) from a seating surface (5, 55, 65, 75).
6. Valve according to claim 1, wherein the force generating means comprises hydraulic pressure (P') and a spring (60) acting in opposite direction on the valve element (53);
   the housing (1) is formed with a converging tapering, cone-shaped sealing surface (55) and the valve element (53) is formed with a matching seating surface (54) and positioned adjacent the sealing surface to form, with the sealing surface, a hydraulic choke in the gap between the sealing and the seating surface, said choke causing build-up of hydraulic pressure tending to move the valve element (53) towards the seating surface formed in the housing.
7. Valve according to claim 1, wherein the valve element (63, 73) has a conical valve sealing surface (64, 74);

a movable valve element (70, 80) is provided, located in the housing, and formed with a seating surface (65, 75) fitting against the conical valve surface (64, 74), the movable element being subjected to pressure from pressurized fluid applied to the valve at the side thereof remote from the valve element.

8. Valve according to claim 7, wherein the movable valve element comprises an elastically deflectable wall portion (70) of the housing.

9. Valve according to claim 7, wherein the movable valve element comprises a sleeve or plug-like sealing element (80) formed with the seating surface, and located in the housing for moving coaxially with said bore axis and positioned at the side of the valve opposite the sealing surface (74) of the valve element (73).

* * * * *